United States Patent [19]

Serrano et al.

[11] Patent Number: 6,049,438
[45] Date of Patent: Apr. 11, 2000

[54] METHOD AND APPARATUS FOR ENCODING DIGITAL SERVO INFORMATION IN A SERVO BURST

[75] Inventors: Louis Joseph Serrano; Mantle Man-Hon Yu, both of San Jose, Calif.

[73] Assignee: International Business Machines Corporation, Armonk, N.Y.

[21] Appl. No.: 08/813,775

[22] Filed: Mar. 7, 1997

[51] Int. Cl.⁷ .................................................. G11B 5/09
[52] U.S. Cl. ............................... 360/49; 360/51; 360/40; 360/44; 360/77.08; 360/78.14
[58] Field of Search ................................ 360/51, 59, 40, 360/44, 49, 77.08, 78.14

[56] References Cited

U.S. PATENT DOCUMENTS

| | | | |
|---|---|---|---|
| 4,195,320 | 3/1980 | Andresen | 360/78 |
| 4,669,004 | 5/1987 | Moon et al. | 360/77 |
| 4,783,705 | 11/1988 | Moon et al. | 360/77 |
| 5,369,535 | 11/1994 | Hetzler | 360/78.14 |
| 5,500,848 | 3/1996 | Best et al. | 369/275.3 |
| 5,523,903 | 6/1996 | Hetzler et al. | 360/77.08 |
| 5,600,499 | 2/1997 | Acosta et al. | 360/40 |
| 5,825,579 | 10/1998 | Cheung et al. | 360/77.08 |

FOREIGN PATENT DOCUMENTS

| | | | |
|---|---|---|---|
| 64-23477 | 7/1987 | Japan | G11B 21/10 |
| 4-302864 | 3/1991 | Japan | G11B 20/12 |

OTHER PUBLICATIONS

IEEE Spectrum, pp. 70, 71, Nov. 1996.
IBM TDB, vol. 33, No. 3B, Aug. 1990, "Quad Burst Servo Needing No Sync ID and Having Added Information", pp. 198–200.

*Primary Examiner*—Alan Faber
*Attorney, Agent, or Firm*—Ingrid M. Foerster; Randall J. Bluestone

[57] ABSTRACT

A method and apparatus for writing binary servo data into the servo bursts contained on the storage medium of a storage device. The binary servo information may include track identifying information such as a track number, cylinder number, head number, sector number, index and/or SID. A burst includes T time slots, each slot comprising one cycle of the servo burst frequency, and the servo data to be written comprises X bits of binary data. Each one-bit of the servo data is represented as a slot containing a transition, and each zero-bit is represented as an empty or null slot. In this manner, the present invention provides a highly bit-efficient scheme for representing digital servo data. A high quality PES signal is assured by writing the binary servo information in such a manner as to guarantee a threshold number of transitions per burst as required for accurate peak-hold detection. Data is encoded to provide a constant or substantially constant number of positive transitions per burst to allow accurate integration detection. If the amount of real estate consumed by the servo regions is less critical than the reliability of the binary data, robustness may be enhanced by using dibits rather than single transitions to represent the data.

66 Claims, 8 Drawing Sheets

| | | Burst Representation | |
|---|---|---|---|
| Head# | | Sn | Sn+1 |
| 0 | 0 | 1 1 0 1 1 1 1 1 1 | 1 1 0 1 1 1 1 1 1 |
| 0 | 1 | 1 1 0 1 1 1 1 1 1 | 1 1 1 1 1 1 1 1 1 |
| 1 | 0 | 1 1 1 1 1 1 1 1 1 | 1 1 0 1 1 1 1 1 1 |
| 1 | 1 | 1 1 1 1 1 1 1 1 1 | 1 1 1 1 1 1 1 1 1 |

*FIG. 5A*

| Track# | Encoded track# | Burst Representation |
|---|---|---|
| 0 0 0 0 0 | 1 1 1 1 1 1 1 1 1 | 1 1 1 1 1 1 1 1 1 |
| 0 0 0 0 1 | 1 1 1 1 1 1 1 1 0 | 1 1 1 1 1 1 1 1 0 |
| 0 0 0 1 0 | 1 1 1 1 1 1 1 0 0 | 1 1 1 1 1 1 1 0 0 |
| 0 0 0 1 1 | 1 1 1 1 1 1 0 1 1 | 1 1 1 1 1 1 0 1 1 |
| 0 0 1 0 0 | 1 1 1 1 1 1 0 1 0 | 1 1 1 1 1 1 0 1 0 |
| ⋮ | ⋮ | ⋮ |

| Track# | Burst Representation | | |
|---|---|---|---|
| 0 0 0 0 0 0 | 1 | 1 1 1 1 1 1 | 1 1 1 |
| 0 0 0 0 0 1 | 1 | 1 1 1 1 1 0 | 1 1 1 |
| 0 0 0 0 1 0 | 1 | 1 1 1 1 0 1 | 1 1 1 |
| 0 0 0 0 1 1 | 1 | 1 1 1 1 0 0 | 1 1 1 |
| 0 1 0 1 0 0 | 1 | 1 1 1 0 1 1 | 1 1 1 |
| ⋮ | ⋮ | ⋮ | ⋮ |
| 1 1 1 1 1 0 | 0 | 1 1 1 1 1 0 | 1 1 1 |
| 1 1 1 1 1 1 | 0 | 1 1 1 1 1 1 | 1 1 1 |

| Head# | Burst Representation |
|---|---|
| 0 0 0 | 1 1 0 1 1 1 0 1 1 1 |
| 0 0 1 | 1 1 1 0 1 1 1 0 1 1 1 |
| 0 1 0 | 1 1 1 1 0 1 1 1 0 1 1 |
| 0 1 1 | 1 1 1 1 1 0 1 1 1 0 1 |
| ⋮ | ⋮ |

FIG. 5E

| Track# | Sn | | | | Sn+1 | |
|---|---|---|---|---|---|---|
| 0 0 0 0 0 0 | 0 0 0 | 1 1 1 | 1 1 | 0 0 0 | 1 1 1 | 1 1 |
| 0 0 0 0 0 1 | 0 0 0 | 1 1 1 | 1 1 | 0 0 1 | 1 1 0 | 1 1 |
| 0 0 0 0 1 0 | 0 0 0 | 1 1 1 | 1 1 | 0 1 0 | 1 0 1 | 1 1 |
| 0 0 0 0 1 1 | 0 0 0 | 1 1 1 | 1 1 | 0 1 1 | 1 0 0 | 1 1 |
| 0 0 0 1 0 0 | 0 0 0 | 1 1 1 | 1 1 | 1 0 0 | 0 1 1 | 1 1 |
| ⋮ | ⋮ | ⋮ | ⋮ | ⋮ | ⋮ | ⋮ |
| 1 1 1 1 1 0 | 1 1 1 | 0 0 0 | 1 1 | 1 1 0 | 0 0 1 | 1 1 |
| 1 1 1 1 1 1 | 1 1 1 | 0 0 0 | 1 1 | 1 1 1 | 0 0 0 | 1 1 |

METHOD AND APPARATUS FOR ENCODING DIGITAL SERVO INFORMATION IN A SERVO BURST

FIELD OF THE INVENTION

This invention relates in general to data storage devices such as magnetic disk drives, and in particular, to a method and apparatus for encoding digital servo information in a servo burst.

BACKGROUND OF THE INVENTION

Data storage devices are well known and include, for example, optical and magnetic disk drives, and magnetic tape drives. Data is typically organized as a plurality of tracks formed on a moving storage medium such as a disk or tape. In disk drives, these tracks may be spiral or have a concentric arrangement. In magnetic tape drives, the tracks are parallel and run in a longitudinal direction of the magnetic tape. Data is written to and read from the data tracks with a transducer supported in close proximity to the tracks by a transducer assembly. The transducer assembly is positionable relative to the tracks under the control of a servo system, and the transducers are electrically coupled to a data channel, which in turn is coupled to a host through an interface. The data channel receives and processes information from the host for writing to the medium. It also receives information sensed from the data storage surface by the transducer assembly and processes it for transfer to the host. The functions of the data storage device, such as servo control, movement of the data storage medium, and data access are controlled by a microcontroller.

An ongoing challenge in disk drive design is to increase the data capacity of the storage medium. This requires reductions in track-to-track spacing as well as tighter bit densities within each track. Smaller track spacings create the need for more accurate servo systems for locating a desired track and data sector. In conventional storage devices, servo systems rely upon servo information written on the data storage surface to accurately position the head relative to a data track. This information typically comprises servo regions or sectors transverse to and interspersed between data tracks including three types of information: a sector identifier or SID, binary position information, and an analog position error sensing (PES) burst pattern. It may also include an index.

The SID is a unique pattern composed, e.g., of bits or dibits, and indicates the start of the servo sector. It is preceded by a repeating automatic gain control (AGC) field, and together these fields synchronize and adjust the gain of the read/write channel to the upcoming servo information. The SID is typically extracted from the transducer signal using a pattern detector coupled to the microcontroller.

The binary position information is used for coarse radial positioning of the transducer during seek operations. It may include a cylinder number used for radial positioning, a head number for uniquely identifying each data storage surface, and a sector number used for verifying the circumferential position of the head. Some or all of this data may be encoded. For example, the cylinder number is encoded using a gray code pattern which varies by only one bit from track to track. The information may also be split among several adjacent servo sectors on the same track to reduce the servo field real estate requirement. For example, in a currently used implementation, the track identifiers comprise highest, middle, and lowest order bits. Each servo sector contains the lowest order bits. In addition, every odd sector contains the middle order bits, and every even sector contains the highest order bits. In a similar manner, bits representing the head and sector numbers may be distributed over several sectors so that one bit of the head number and one or more bits of the sector number are written to each of n adjacent servo sectors. Since the head and sector numbers do not change in a radial direction and are small, they may be written to the disk without encoding.

The binary servo information is extracted from the analog transducer read signal with digital demodulation circuitry, and decode logic if necessary. The demodulation circuitry typically comprises a peak detection circuit or a partial-response maximum likelihood (PRML) channel.

The PES field comprises a plurality of radially repeating burst patterns arranged in a predetermined fashion relative to the data tracks. Each burst includes a plurality of radially oriented transitions of a predetermined frequency which contribute to the sensed transducer signal. When the transducer signal is demodulated, a PES signal is produced whose magnitude varies proportionally with transducer displacement from the track center. The PES is generally produced using a peak-hold or area integration circuit. A peak-hold circuit requires at least a minimum number of transitions in each burst field to obtain an accurate measure of the signal amplitude. An area integration circuit operates best if a same number of transitions are provided within each burst field.

The accuracy of a servo positioning system increases with the frequency of servo information provided. However, each servo sector provided reduces the amount of storage space available for user data. It is therefore desirable to reduce the circumferential real estate occupied by each servo sector. One approach for doing this is to combine the binary servo information with the burst patterns in a single field. The data must be represented in a manner which does not adversely affect generation of the PES signal, i.e., which provides a minimum number of transitions in the burst field for peak-hold detection and a relatively constant number of transitions per burst for integration detection.

A IBM Technical Disclosure Bulletin Vol. 33, No. 3B, Published August 1990 entitled "Quad Burst Servo Needing No Sync ID and Having Added Information" discloses a method for encoding information into the PES field which modulates the positions of the burst transitions. The approach assures that the fundamental frequency of the burst patterns is not changed by maintaining the same zero-crossing points. Ones and zeroes are distinguished by changing the width or sine component about the zero-crossing point, a 120 degree width representing a one and a 60 degree width representing a zero. This approach requires use of low frequency flux transitions in the servo bursts, which consumes more real-estate than a high frequency pattern. Moreover, customer data in modern disk drives is written at high frequencies and is passed through some components in the data channel used in servo data detection (e.g., filters). It is therefore desirable to reduce the disparity between the data and servo frequencies, rendering this approach impractical.

U.S. Pat. No. 4,195,320 to Andresen discloses a method for encoding decimal track addresses into fixed length A and B servo burst regions. Andersen uses an integration circuit to demodulate the PES bursts, and is therefore concerned with maintaining a same number of "1's" and "0's" in each burst field. The decimal digits of the track address are represented as time between flags. That is, each digit is represented by a number of data clock transitions ("0101 . . . ") equal in number to the digit, and is separated from other encoded digits by one of two complementary delimiting fields ("01100" and "10011") selected to preserve an even number of "1's" and "0's" within the burst field. For example, a decimal address of 145 is represented by a single clock transition "1" representing decimal digit "1", delimiting field "01100", four clock transitions "1010" representing the decimal digit "4", delimiting field "10011", five clock transitions representing the decimal digit "5", and delimiting field "10011". A variable "energy balance" field is provided after the encoded data to maintain a fixed burst size and to also assure an equal number of "1's" and "0's" within the burst field. The entire encoded sequence is further delimited by unique, complementary start and end flags ("11000" and "00111"). It should be readily apparent that the encoding scheme of Andresen lacks efficient use of space, and this problem is compounded by the need for delimiting fields.

A more efficient method for encoding n-bit cylinder address codes in the servo bursts is disclosed in Japanese Patent Application JA4-302864 to Yatake et al. Each of the n bits of the cylinder address is represented by three time slots: a "0" is represented by "110" and a "1" by "101". The first time slot always contains a positive going pulse which provides a regular data clock, and which is used by peak-hold detection circuitry to produce the PES signal from the burst. Although more space-efficient than Andresen, this phase-modulation approach still includes substantial overhead, requiring three transitions to represent one bit of digital servo data.

What is needed, therefore, is a highly efficient scheme for representing digital servo data within the servo burst fields without adversely affecting generation of the PES signal.

SUMMARY OF THE INVENTION

Accordingly, a method and apparatus are disclosed for writing binary servo data into the servo bursts contained on the storage medium of a storage device. The binary servo information may include track identifying information such as a track number, cylinder number, head number, sector number, and/or SID. This information may be represented in the burst as is, partially encoded, or fully encoded. A burst includes T time slots, each slot comprising one cycle or half-cycle of the servo burst frequency, and the servo data to be written comprises X bits of binary data. Each one-bit of the servo data is represented as a slot containing a transition, and each zero-bit is represented as an empty or null slot. In this manner, the present invention provides a highly bit-efficient scheme for representing digital servo data.

In a specific embodiment of the invention, a high quality PES signal is assured by writing the binary servo information in such a manner as to guarantee a threshold number of transitions per burst as required for accurate peak-hold detection. This is accomplished, for example, by encoding the binary data, prior to writing, using an encoding scheme selected to provide the threshold number of transitions per burst. Alternatively, if the difference T-X (number of burst time slots minus the number of bits of binary servo data) is less than the threshold number, the binary data may be split into smaller portions, each portion being written to a different servo sector along the same data track. The binary data is split such that the number of burst time slots minus the number of bits of the binary servo data portion does not exceed the threshold number, thus assuring at least the threshold number of transitions per burst.

In an alternative embodiment, the data is encoded to provide a constant or substantially constant number of positive transitions per burst to allow accurate integration detection. For example, it is assumed that the digital servo information to be encoded comprises a binary word having a plurality of possible values. According to this embodiment, each word is encoded as a unique pattern of N ones and M zeroes. The ones are represented in the burst as transition-containing slots, and the zeroes as empty slots. This approach assures a fixed number of transitions per burst. Moreover, it provides the number of unique words required while minimizing the number of time slots that must be forfeited to represent the data, since the number of words that can uniquely be represented according to this approach is $(N+M)!/N!M!$ and N transitions are guaranteed. Alternatively, the data may be written together with its ones complement to assure consistency.

If the amount of real estate consumed by the servo regions is less critical than the reliability of the binary data, robustness may be enhanced by using dibits rather than single transitions to represent the data. That is, each servo data bit is represented using two time slots of the servo burst, a one-bit being represented as a dibit, and a zero-bit being represented as one or two empty time slots.

DETAILED DESCRIPTION

Figure 1:
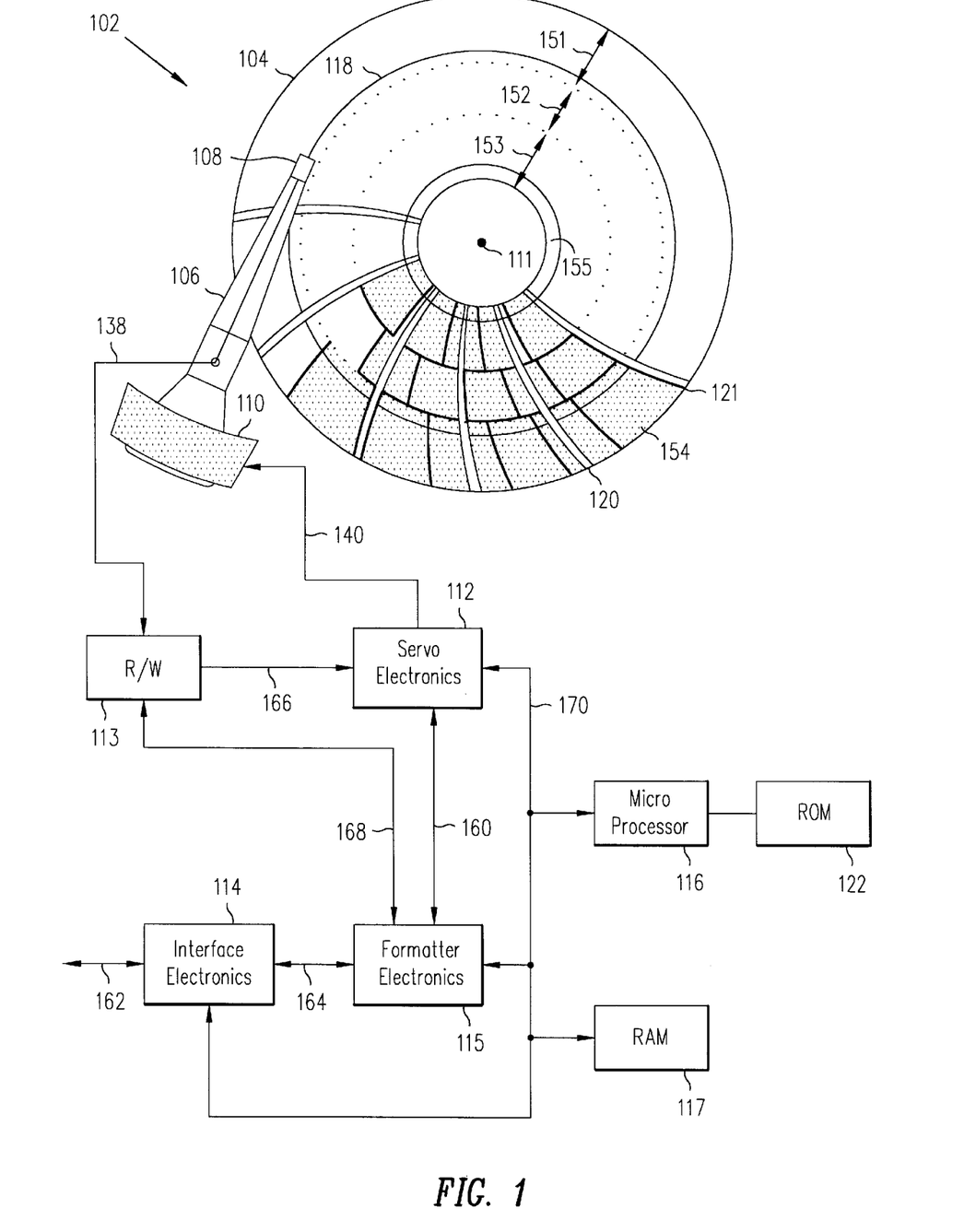
FIG. 1 is a schematic diagram illustrating a fixed block architecture disk drive suitable for practicing the present invention.

Shown in FIG. 1 is a storage device suitable for practicing the present invention. The device is a disk drive formatted with a fixed block architecture having sector servo and zone-bit recording. The disk drive, designated generally as 102, includes a data storage medium or disk 104, actuator arm 106, data recording transducer 108 (also called a recording head), voice coil motor 110, servo electronics 112, read/write electronics 113, interface electronics 114, formatter electronics 115, microprocessor 116 and associated non-volatile storage or ROM 122, and volatile storage or RAM 117. The microprocessor 116 exercises control over the disk drive electronics by executing control microcode preferably stored in ROM 122 and on an area 155 of the disk 104 reserved for non-user data. During operation, the control microcode is loaded from ROM 122 and disk area 155 into temporary storage, such as RAM 117, for execution by the microprocessor 116. Storage disk 104 also includes center of rotation 111, and is divided for head positioning purposes into a set of radially spaced tracks, one of which is shown at 118. The tracks are grouped radially into a number of zones, three of which are shown as 151, 152 and 153. Data is recorded at a different data rate in each zone to maximize bit density across the disk. The disk contains a plurality of servo sectors 120, which extend across the tracks in a generally radial direction. These will be described in more detail subsequently. Each track has a reference index 121. Within each zone, the tracks are circumferentially divided into a number of data sectors 154. Preferably, the data sectors contain no sector ID fields for increased data capacity, as described in U.S. Pat. No. 5,523,903 to Hetzler et al. In accordance with the normal meaning of "fixed block architecture", all data sectors are substantially the same size, e.g., 512 bytes of data. However, it should be noted that the present invention may easily be adapted to variable length architectures. The number of data sectors per track varies from zone to zone. Consequently, some of the data sectors are split by servo sectors. If the disk drive has multiple heads, then the set of tracks which are at the same radius on all surfaces is referred to as a "cylinder".

Read/write electronics 113 receives signals from transducer 108, passes servo information to servo electronics 112, and passes data signals to formatter 115. Servo electronics 112 uses the servo information to produce a current at 140 which drives voice coil motor 110 to position recording transducer 108. It also contains a detection circuit for extracting digital information from the pattern, as will be described subsequently. Interface electronics 114 communicates with a host system (not shown) over interface 162, passing data and command information. Interface electronics 114 also communicates with formatter 115 over interface 164. Microprocessor 116 communicates with the various other electronics over interface 170.

In the operation of disk drive 102, interface electronics 114 receives a request for reading or writing data sectors over interface 162. Formatter electronics 115 receives a list of requested data sectors from interface electronics 114 in the form of logical block addresses and converts them into physical addresses, i.e., a zone, cylinder, head and sector number uniquely identifying the location of the desired data sectors. The zone, head and cylinder information are passed to servo electronics 112, which is responsible for positioning recording head 108 over the appropriate data sector on the appropriate cylinder. If the cylinder number provided to servo electronics 112 is not the same as the track number over which recording head 108 is presently positioned, servo electronics 112 first executes a seek operation in order to reposition recording head 108 over the appropriate cylinder. The seek operation uses coarse digital position information in the servo sector, such as a cylinder and head number, to identify the desired track.

Once servo electronics 112 has positioned recording head 108 over the appropriate cylinder, the transducer is maintained over the cylinder in a track following mode using fine positioning servo information provided by the burst patterns. The desired data sectors are located by reading their ID fields. Alternatively, in a disk drive employing a headerless or NoID™ architecture, the servo electronics 112 begins executing sector computations in order to locate and identify the desired data sector, as described in U.S. Pat. No. 5,500, 848 is used to identify each servo sector, which is incorporated herein by reference. Briefly, a starting data sector is identified by its offset from the index mark. Since the track format is presumably known, the number of data sectors passed since index is determined from the servo sector count, and a precise offset into the appropriate data region may be determined.

Figure 2:
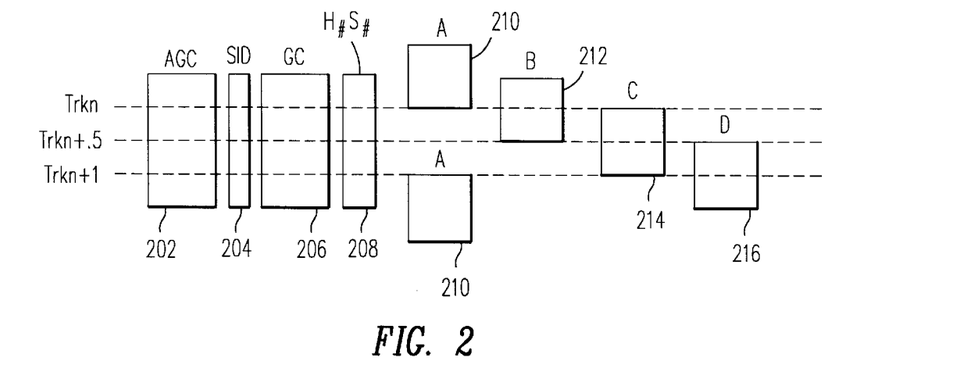
FIG. 2 is a schematic diagram illustrating a prior art servo sector.

Referring now to FIG. 2, a prior art servo sector is shown. In the circumferential direction it includes an AGC field 202, a SID 204, a gray code 206 representing a cylinder number, head and sector numbers 208, and quadrature servo burst patterns A–D 210, 212, 214, 216. In the radial direction, the servo sector is shown spanning two data tracks, Trk n and Trk n+1. Half track position Trk n+0.5 is also indicated. According to a conventional quadrature burst pattern, the A and C bursts share a common boundary along each track center, whereas the B and D bursts share a common boundary at each half-track.

Figure 3A:
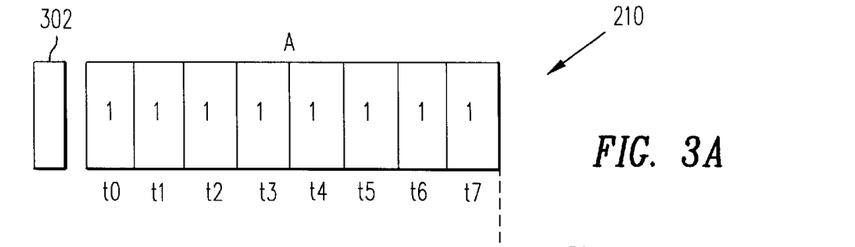
FIG. 3A is a schematic diagram of a prior art servo burst field.

FIG. 3A is an enlarged view of an A burst 210 of FIG. 2. The burst 210, which is also representative of bursts B–D 212, 214, 216, includes a plurality of time slots, t0–tn, each containing a transition. Although eight time slots are shown for purposes of illustration, the actual number of slots will be determined by the circumferential length of the burst field and the frequency at which the burst transitions are recorded. Although transitions are generally represented as a "1", their actual form will vary with the type of storage medium used. For example, in a magnetic storage device, each transition comprises a flux reversal.

Figure 3B:
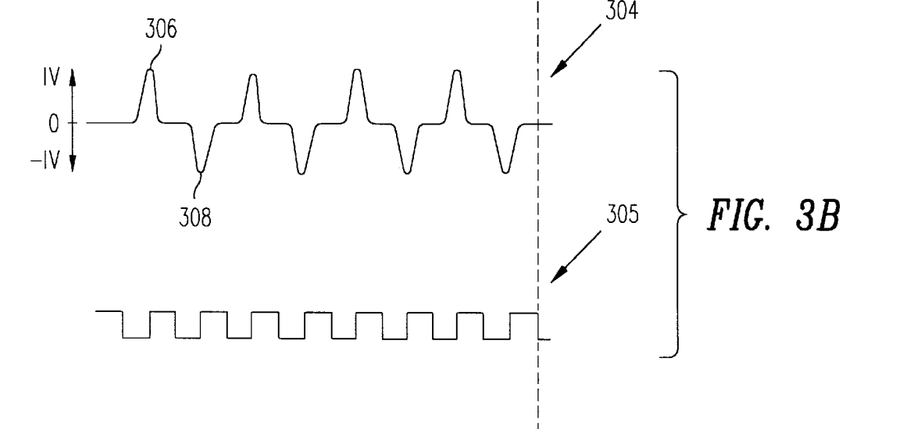
FIG. 3B represents a transducer signal obtained from the burst pattern of FIG. 3A, relative to a clock signal.

Also shown in FIG. 3A is a transducer 302 radially aligned with the A burst 210. As the transducer 302 passes over the burst pattern 210, sensing signal 304 of FIG. 3B is generated. Each transition of the burst pattern 210 causes a corresponding peak 306, 308 in the transducer signal 304. The timing of these peaks is shown relative to a reference clock 305 having the same frequency as the burst transitions. This clock 305 may be obtained using the AGC field and SID to adjust a variable frequency oscillator to match the frequency and phase of the servo information. Alternatively, a high frequency clock may be divided down to a matching phase with the guidance of the AGC field. If the head is radially aligned with the burst 210 as shown, and assuming a maximum amplitude of one volt, each peak 306, 308 of the sensed signal will have a maximum amplitude of about ±1V. The peak amplitudes vary with radial transducer 302 position. For example, when the transducer 302 is radially aligned with track n, it will only pass over half of the burst pattern, and the resulting transducer signal 304 from the A burst 210 will have a maximum peak amplitude of about ±0.5 V.

Figure 3C:
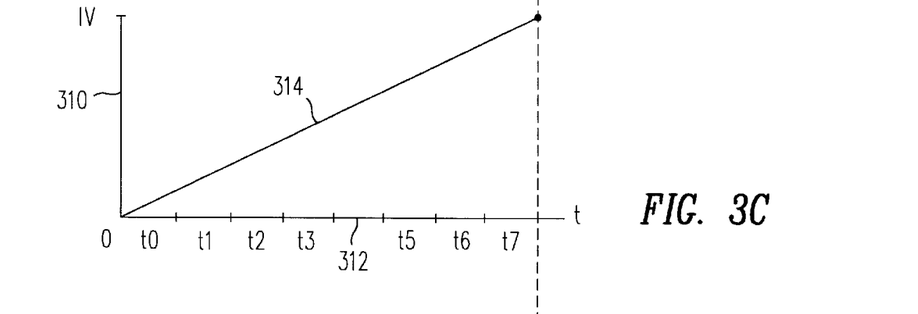
FIG. 3C is a graph illustrating an area integration method for obtaining the PES signal from the transducer signal of FIG. 3B.
Figure 3D:
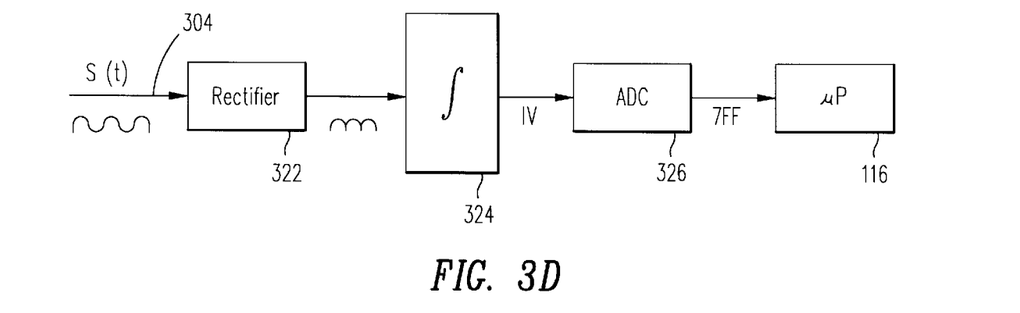
FIG. 3D is a block diagram of an exemplary area integration detection circuit.

FIG. 3C is a graph illustrating an area integration method for obtaining a PES signal, and FIG. 3D is a block diagram of an exemplary area integration circuit. Transducer signal S(t) 304 derived from the burst pattern of FIG. 3A is sinusoidal (also see FIG. 3B). According to conventional methods, the transducer signal S(t) 304 is first rectified by a full-wave rectifier 322 and then input to an integrating circuit 324, where the transitions are summed to produce segment 314 of the PES signal, approaching a maximum amplitude gain. This gain is fed to an analog-to-digital converter 326, which converts it into some digital representation such as '7FF'X, for example. The digital value is then input to the microprocessor, where the servo microcode converts it into a track value. If the transducer 302 is perfectly aligned with the burst, this value will be at a maximum, i.e., one track, for the burst pattern shown in FIG. 2. The microprocessor combines or "stitches" the burst information with similar signals obtained from the B, C and D bursts of the quad burst pattern and with the grey code according to conventional methods to produce a continuous position signal. For a more detailed explanation of PES signal generation, the reader is referred to U.S. Pat. No. 5,825,579, "Disk Drive Servo Sensing Gain Normalization and Linearization." Since each burst's radial position differs, the transducer alignment with respect to each burst will differ, causing the amplitudes of their corresponding gains to differ.

It should be apparent from the preceding that the area integration method is sensitive to any reduction in the number of transitions per burst—a reduction that will result when digital data is encoded therein. Fewer transitions cause a corresponding reduction in the gain of the PES segments. A valid position signal could still be obtained if the amplitude reduction of each burst were known, since the PES signal may be normalized according to the method disclosed in U.S. Pat. No. 5,825,579. The normalization process would be simplified if the gain of each burst were reduced by a same amount. Consistent reduction may be achieved by selecting an encodement scheme that assures a same or substantially same number of transitions per burst field.

Figure 3E:
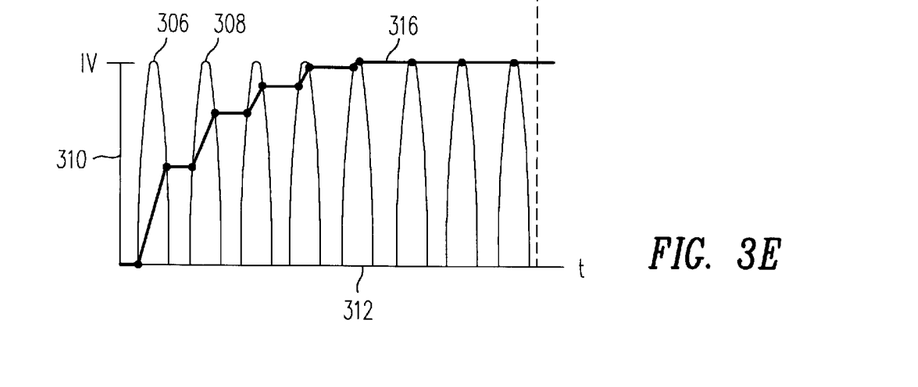
FIG. 3E is a graph illustrating a peak-hold method for obtaining the PES signal from the transducer signal of FIG. 3B.

FIG. 3E is a graph illustrating a peak-hold method for obtaining a PES signal. The transducer signal S(t) 304 is input to a rectifier, and the rectified transducer signal is fed into a capacitor circuit . The capacitor receives the first transition pulse and charges for the duration of the pulse. It then holds its charged value until the next peak occurs, and then as shown by signal 316 continues charging for the duration of each subsequent peak until it reaches the maximum amplitude of the pulses. Due to the iterative charging process, it is necessary to provide at least a threshold number of pulses per burst to the peak-hold circuit to obtain the maximum peak amplitude.

The present invention will now be described with reference to FIGS. 4A–4D. Digital servo data formerly preceding the burst patterns in a servo sector is now encoded into each PES burst. A first aspect of the invention improving over the prior art is that each bit of the binary servo information is represented within a single time slot of the burst pattern. Unlike the prior art, there is no need to use multiple time slots to represent each bit, nor is there a need for delimiting the servo data with flags. Rather, the binary data is efficiently "amplitude demodulated" on a bit-by-bit basis. The digital information may include one or more of the following: the SID, the index mark, and track identifying information such as a cylinder number, track number, head number, and sector number. Moreover, it may be entirely encoded, or only encoded in part, and may be split among a plurality of adjacent servo sectors. As a second aspect of the invention, the digital servo data is written into the burst in a manner that assures a threshold number of transitions to be present within the burst, allowing accurate peak-hold detection of the burst patterns. Alternatively, the binary data is written in a manner that assures a same or substantially constant number of transitions per burst for accurate area integration detection.

Figure 4A:
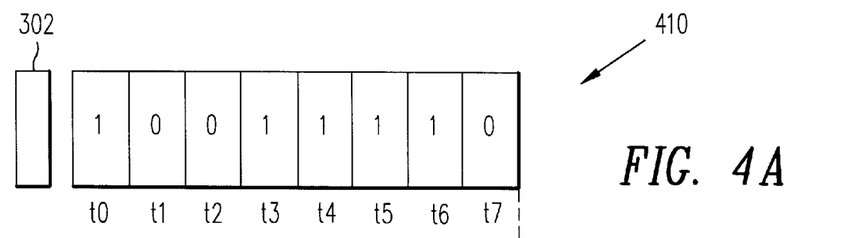
FIG. 4A is a schematic diagram of a servo burst field encoded with digital servo information according to the present invention.

Referring first to FIG. 4A, a schematic diagram is shown of a servo burst field 410 containing digital servo information. Preferably, each burst of a servo sector, e.g., each burst in the quadrature pattern, contains the same digital information. Only some of the timing slots, t0–tn, of the burst field include transitions, whereas the rest contain nulls. For purposes of the present example, it will be assumed that the burst contains a sufficient or threshold number of transitions to allow peak-hold detection of the PES burst. The specific methods for assuring the threshold number of transitions per burst will be described subsequently. The threshold number is determined by the specific charging characteristics of the capacitor in the peak-hold circuit.

Figure 4B:
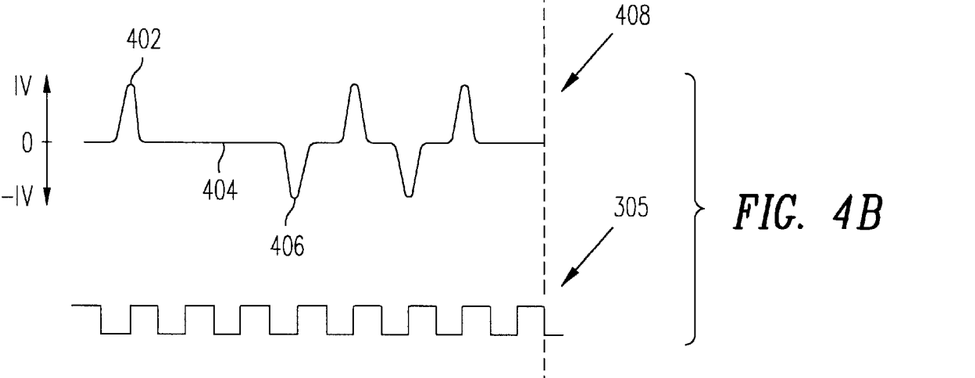
FIG. 4B represents a transducer signal obtained from the burst pattern of FIG. 4A, relative to a clock signal, according to the present invention.

As transducer 302 passes over the encoded burst field 410, the transducer signal 408 shown in FIG. 4B is generated. It includes peaks 402, 406 which correspond in time to the time slots containing transitions, and flat portions 404 corresponding in time to the null slots. A reference clock signal 305 synchronized to the servo burst frequency via the AGC field and SID is provided for reference. This reference clock will be used to extract and digitize the binary data.

Figure 4C:
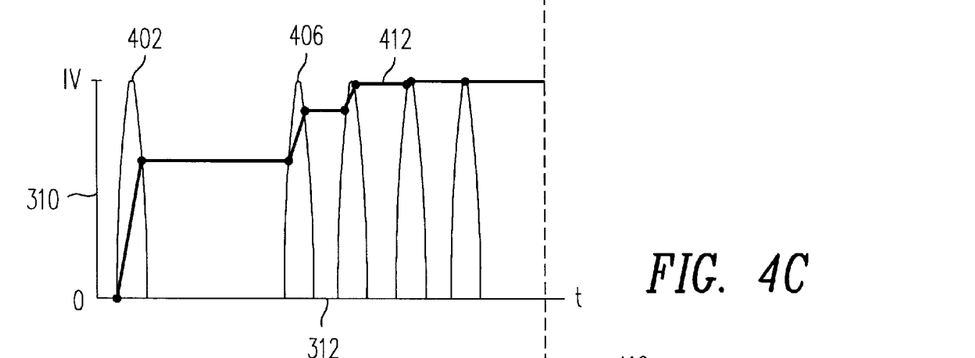
FIG. 4C is a graph illustrating peak-hold detection of the transducer signal of FIG. 4B.

FIG. 4C is a graph illustrating peak-hold detection of the transducer signal 408. Area integration may also be used, provided that the method for encoding the digital servo data provides a same or substantially same number of transitions within each burst of the storage medium. As shown by the progression of capacitor output signal 412, the peak-hold capacitor continues to charge to a maximum gain because a minimum number of peaks are present in the burst field being sensed.

Figure 4D:
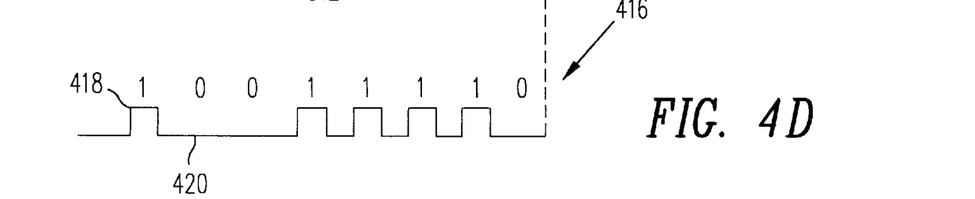
FIG. 4D represents digital data extracted from the transducer signal of FIG. 4B according to the present invention.

Concurrently with generation of the PES signal, digital servo data is being extracted to produce a digital representation 416 as shown in FIG. 4D. The data is preferably extracted using conventional peak detection circuitry. That is, if the transducer signal corresponding to a particular timing slot of the PES pattern exceeds a minimum threshold value, then the time slot is deemed to contain a one-bit, and a digital pulse 418 is generated. Otherwise, the time slot is deemed to be null and no pulse is generated 420.

Since the PES bursts of a servo sector are radially offset with respect to one another, the amplitude of the transducer signal will vary depending on the burst being sensed as was previously noted. For example, if the transducer is aligned with track n in FIG. 2, it would only sense half of the A burst 210, resulting in a transducer signal with peak amplitudes of about 0.5 V. Similarly, only half of the C burst 214 is sensed, resulting in 0.5 V transducer signal peaks. The B burst 212 would be fully aligned with the transducer, producing a transducer signal with 1 V peaks, and the D burst 216 would be out of range of the transducer, producing a substantially flat signal. Thus when the head is aligned with the track, the minimum threshold voltage for peak detection can be set to a value of about 0.3 V so that digital information can be extracted from the A, B and C bursts. The signal with the largest amplitude is then selected for decode, but the other signals may also be checked for verification. Thus redundancy is built into the detection scheme for greater readback reliability.

The detection circuitry extracts the digital servo data using the reference clock, which has been synchronized to the timing slots of the PES bursts. Each clock cycle serves as a timing window for detecting the presence or absence of a pulse in the transducer signal, according to known methods.

Figure 5A:
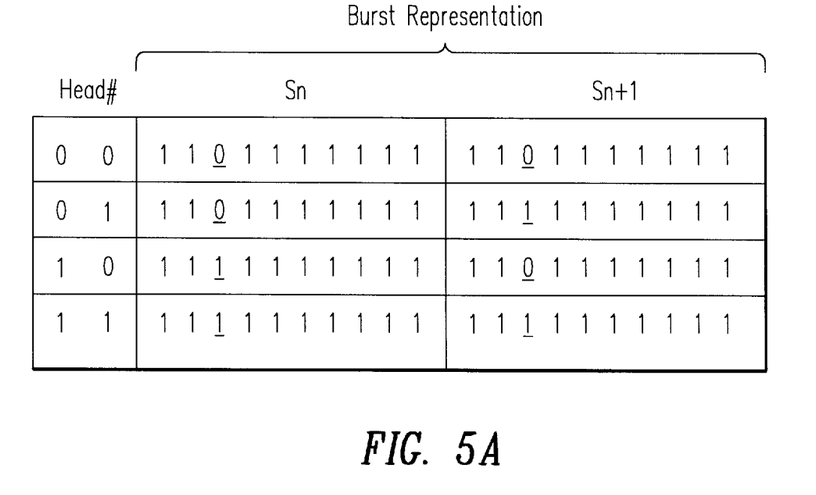
FIGS. 5A–5E are tables representing methods for representing digital servo data in the burst signals according to the present invention.

Two methods are proposed for guaranteeing a threshold number of transitions per burst according to the present invention. The data must be FIG. 5A is a table illustrating the first method. According to the present example, each PES pattern is assumed to have ten time slots. It will be assumed that a two-bit head number is to be encoded into the burst fields. The remaining digital servo data precedes the burst field according to prior art schemes. If the head number were to be written to a single servo burst, it would occupy two out of the ten time slots. Since the head number may have a value of '00', only eight transitions per burst can be guaranteed to appear in the burst field. This is not an issue if the threshold number of transitions required for peak-hold detection is less than or equal to eight. However, if the threshold number is nine, this representation scheme would fail to guarantee the required threshold.

To resolve this problem, the head number is split over two sectors, Sn and Sn+1, as shown in the table of FIG. 5A, so that the bursts of each sector now possesses a minimum number of transitions regardless of the head value. According to this example, which assumes that an even number of servo sectors are present on the track, the highest order bit of the head number is written to a predetermined time slot of each burst in sector n, and the lowest order bit is written to the predetermined time slot of each burst in sector n+1. Time slot t2 is arbitrarily chosen in the present example.

While the present example deals with head numbers, the same basic approach may be used for other types of binary servo information, provided that the binary data can be split among multiple sectors in a manner which allows a minimum number of transitions per burst for peak-hold detection. For example, assuming a ten slot burst, a threshold value of six transitions, and twelve bits of binary servo data, the 12-bit data can be divided into portions and written to a plurality of adjacent servo sectors. Since six slots of each burst must contain transitions, each data portion may not occupy more than (10 slots−6 slots)=four bits of information. Obviously, there are a number of ways to do this. For example, the data may be split into three four-bit portions, four three-bit portions, etc., the particular format depending on the total number of servo sectors on the track. That is, if the total number of servo sectors is divisible by three, three portions of four bits can be selected. If the number is divisible by four, four portions of three bits may be selected. It should be kept in mind, however, that readback reliability is maximized by spreading the data over as few servo sectors as possible.

Assuming that the total number of servo sectors is divisible by three, three four-bit portions are distributed over groups of adjacent servo sectors. The first portion of the data is written to sectors n, n+3, n+6, and so on. In a similar fashion, the second portion is written to sectors n+1, n+4, n+7, etc., and the third position is written to sectors n+2, n+5, n+8, etc. In this manner, four time slots of each burst in a servo sector contain binary information, and the remaining six contain transitions, satisfying the minimum threshold requirement.

It should be noted that in the first example, the head number will be the same for all bursts on a storage surface. Consequently, a same number of bits will appear in all of the bursts of the same data surface. This particular implementation may therefore be suitable for area integration as an alternative to peak-hold detection.

A concern may arise about accurately reading all portions of binary servo information which has been split over several servo sectors when the storage medium is moving at high speed. A failure to read any portion of the data will require a retry at the next set of servo sectors. The present invention greatly reduces this concern. Specifically, the servo sector size is reduced, allowing more servo sectors to be provided per track without reducing data capacity. More servo sectors provide more opportunities for reading the data coherently.

Figure 5B:
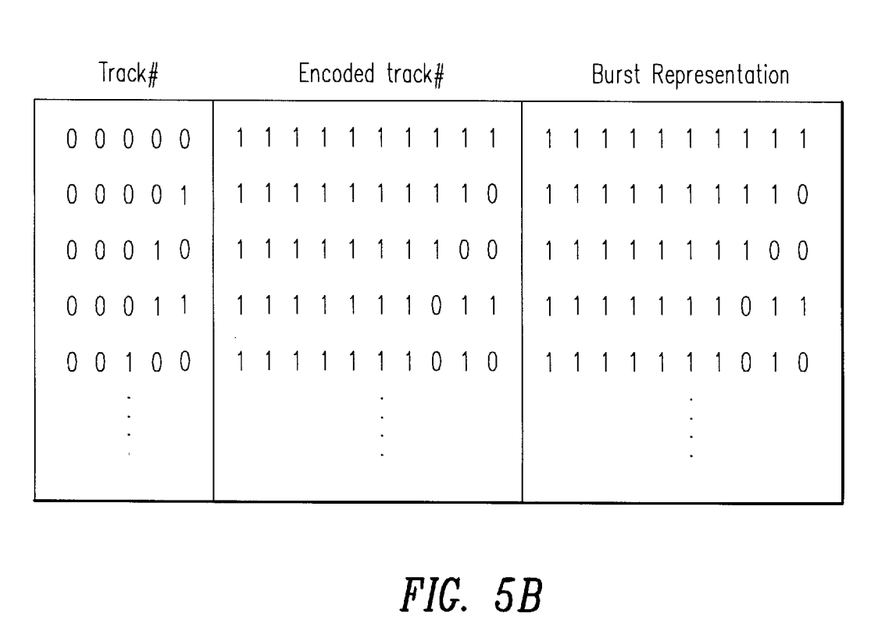

FIG. 5B illustrates the second method for guaranteeing a minimum number of transitions per burst field, wherein a 5-bit binary track number is to be represented in a burst. For this example, it shall be assumed that the burst has ten time slots and that the threshold number of transitions required for accurate peak-hold detection is eight. If the track number were written directly to the burst field, it would occupy five time slots, leaving only five guaranteed transition-containing slots. Instead, the track numbers are first encoded with a set of ten-bit patterns, each having no more than two zeroes, such that at least eight time slots will contain ones in any burst pattern. The data is encoded and decoded using means such as a look-up table containing every track number and its corresponding representation. Alternatively, an algorithm or dedicated hardware may be used for this purpose. Since the variation in the number of transitions is small, this method may also be suitable for storage devices using area integration detection, particularly if the position error signal is normalized.

Figure 5C:
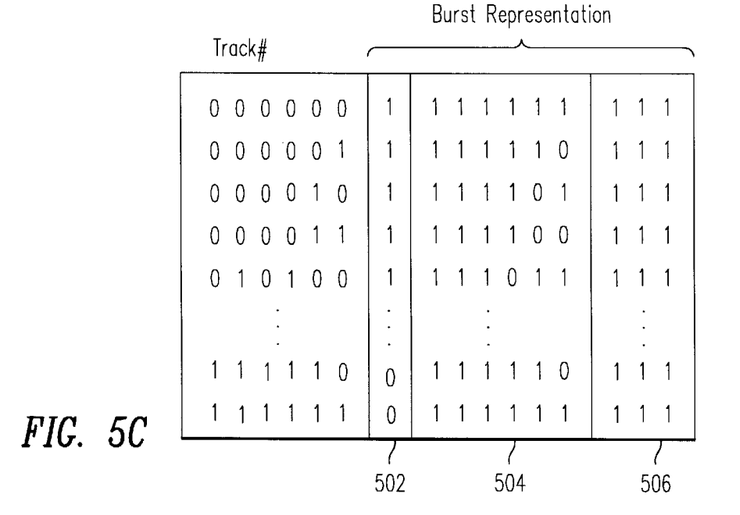

Yet another method for assuring a minimum number of bits per burst is to selectively write either the digital servo data or its ones complement, as shown in FIG. 5C. The selection is based upon which version will provide more transitions in a burst. A special field in the burst indicates which version of the data has been written. For example, in FIG. 5D, column 502 indicates the status of the ensuing binary data. A "1" in column 502 indicates that the ones complement of the data follows in column 504, whereas a "0" indicates that the data in column 504 has not been changed. The remaining time slots of the burst are filled with transitions, as shown in column 506. According to this scheme, no less than half the bits of the written data will be ones (in this case, three). Adding this number to the number of transitions in column 506 gives the total number of guaranteed transitions (here, 3+3=6 guaranteed transitions).

Figure 5D:
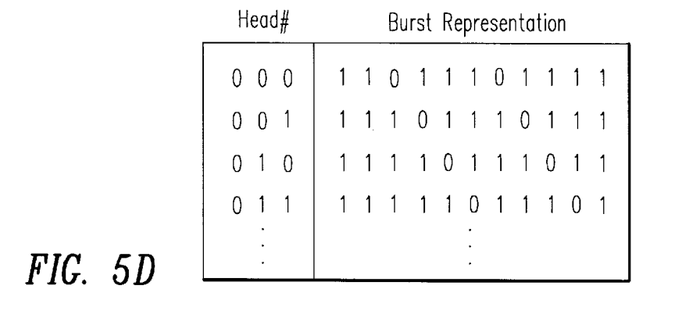

In an alternative embodiment of the invention, the binary servo data is written to the bursts in such a manner as to assure a fixed number of transitions per burst. FIG. 5D illustrates a method for representing digital servo data which assures a same number of bits per burst and is therefore compatible with area integration detection schemes. A three-bit head number is shown for purposes of illustration, but other servo information would be similarly represented. According to this method, M zero-bits are spaced over a burst comprising ten time slots, and the remaining N time slots are filled with transitions. Here, M=2 and N=8. Thus eight transitions are guaranteed in each burst. Moreover, a total of (N+M)!/N!M!=45 words can be represented in this manner. Since only eight head values are possible for a three-bit head number, this scheme provides more than enough unique patterns for the present example. As another example of this encoding scheme, if the number of burst slots were increased to twenty-four time slots, N=16 and M=8, then 735,471 words could be represented. As should be apparent, this is a highly bit-efficient encoding scheme when considering the number of words which can be represented.

Figure 5E:
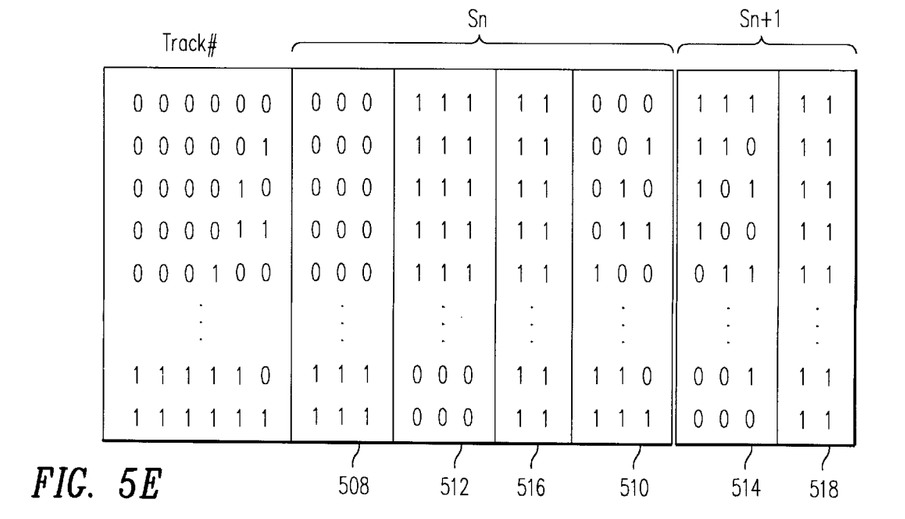

An alternative method is shown in FIG. 5E. According to this method, X bits of binary servo data are written to the burst, followed by their ones complement. If the digital servo data has a length longer than half of the PES burst length, e.g., if X is more than five bits for a burst length of ten time slots, then the digital servo data is be split over multiple sectors as shown, each portion being written followed by its ones complement. For example, a track number "000001" contains X=6 bits. Since X>5, the track number is split into two portions, "000" and "001". Each portion no longer than half of the burst length. The first portion, "000", is written to each burst of sector Sn, as represented in column 508. These bits are followed by their ones complement, "111", as represented in column 512. The remaining time slots of each burst are filled with Y transitions, as represented by column 516. Similarly, the second portion, "001", is written to each burst of sector Sn+1, as represented in column 510, followed by its ones complement, "110", as shown in column 514. Again, the remaining time slots of each burst are filled with Y transitions, as represented by column 518. In this manner, each burst contains a fixed number X/2+Y of transitions.

Figure 6A:
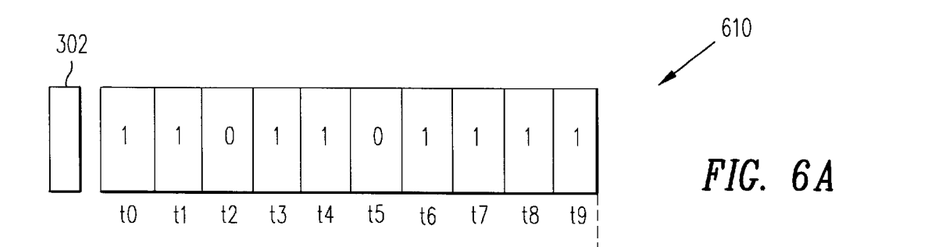
FIG. 6A is a schematic diagram of a servo burst field containing the encoded data of the table shown in FIG. 5 according to the present invention.
Figure 6B:
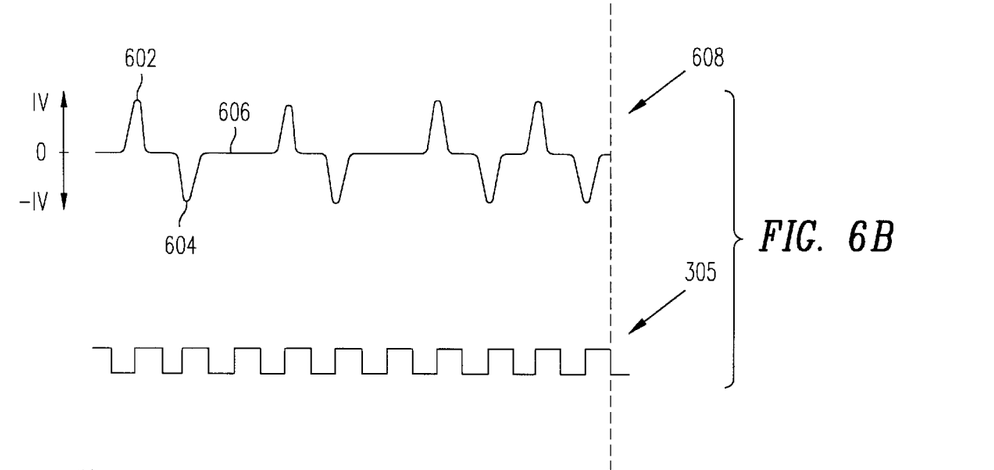
FIG. 6B represents a transducer signal obtained from the burst pattern of FIG. 6A, relative to a clock signal, according to the present invention.

FIG. 6A is a schematic diagram of a servo burst field 610 containing digital servo data represented as shown in the table of FIG. 5D. Each burst of the same servo sector preferably is written in an identical manner for redundancy. As transducer 302 passes over the burst 610, the signal 608 of FIG. 6B is obtained. As before, it contains peaks 602, 604 which correspond in time to time slots containing transitions, and flat portions 606 corresponding to null time slots. The signal 608 is shown relative to a clock signal 305 running at half the frequency of the burst transitions.

Figure 6C:
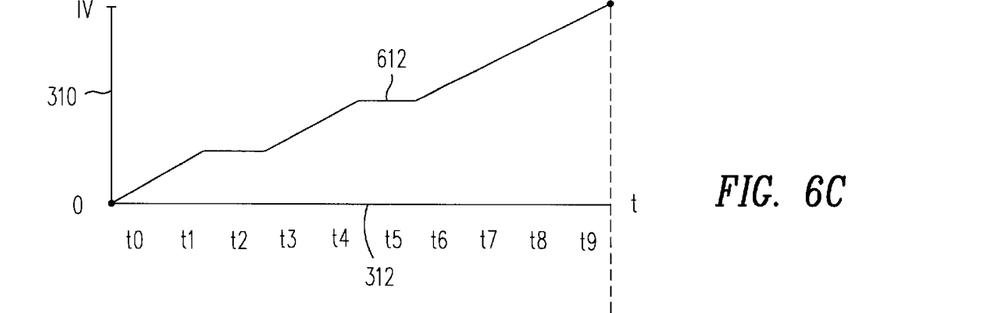
FIG. 6C is a graph illustrating an area integration method for obtaining the PES signal from the transducer signal of FIG. 6B.

FIG. 6C illustrates area integration of the transducer signal of FIG. 6B. As can be seen, the gain is affected by the null time slots of the burst pattern. However, since the number of transitions per burst is constant and known throughout the data surface, the gain may be boosted to make up for the deficiency, resulting in a maximum value of 1 V. In addition, the gain curve 612 may be normalized, as previously discussed, for a smoother position signal after stitching.

Figure 6D:
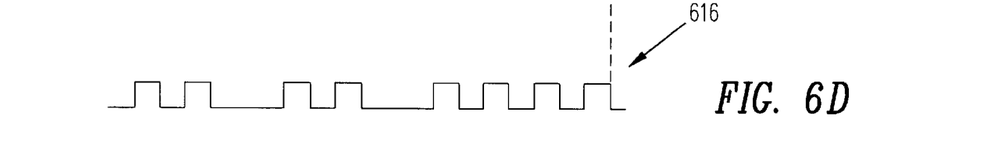
FIG. 6D represents digital data extracted from the transducer signal of FIG. 6B; according to the present invention.

FIG. 6D represents digital data concurrently extracted from the transducer signal of FIG. 6B according to the present invention. Again, a pulse is indicated only when a time slot of the burst pattern contains a transition.

Figure 7:
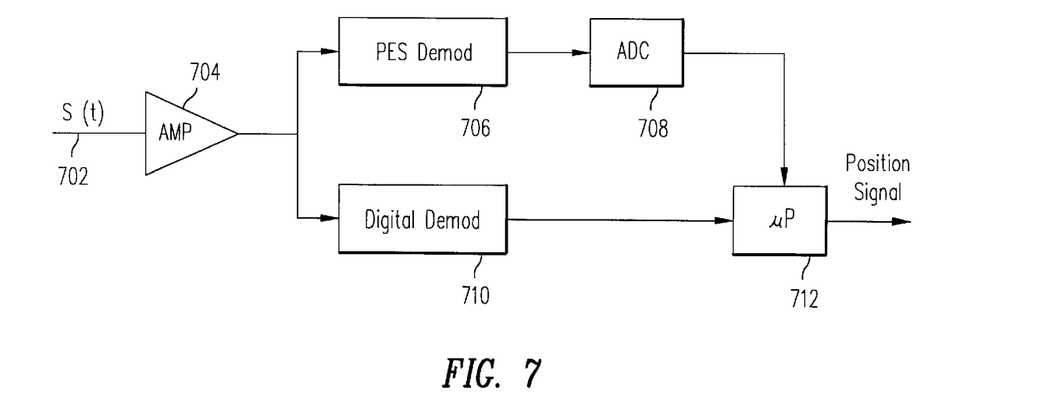
FIG. 7 is a block diagram of a detection circuit in the servo electronics for detecting both PES and digital servo data from a burst field according to the present invention.

FIG. 7 is a block diagram of an exemplary detection circuit in the servo electronics for detecting both PES and digital servo data from a burst field according to the present invention. The analog transducer signal is received by an amplifier 740 and is provided to both the PES and digital detection circuits. The PES detection circuit includes a demodulator 706, which may comprise a peak-hold circuit or area integration circuit, for example. The output of the demodulator 706 may then be digitized by analog-to-digital (A/D) converter 708. The digitized PES signal is then provided to microprocessor 712, where it will be stitched with digital servo information to produce a position signal indicative of transducer position.

The digital detection circuit includes a digital demodulator 710, comprising a peak detection circuit, for example. The digital demodulator 710 creates a digital pulse stream from the incoming analog signal using a predetermined minimum threshold amplitude. The digital stream is provided to the microprocessor 712 which selects the digital information from one of the four bursts and uses it to create the position signal. The microprocessor 712 may also compare the digital data extracted from the selected burst with digital data extracted from other detected bursts for redundancy checking.

Figure 8A:
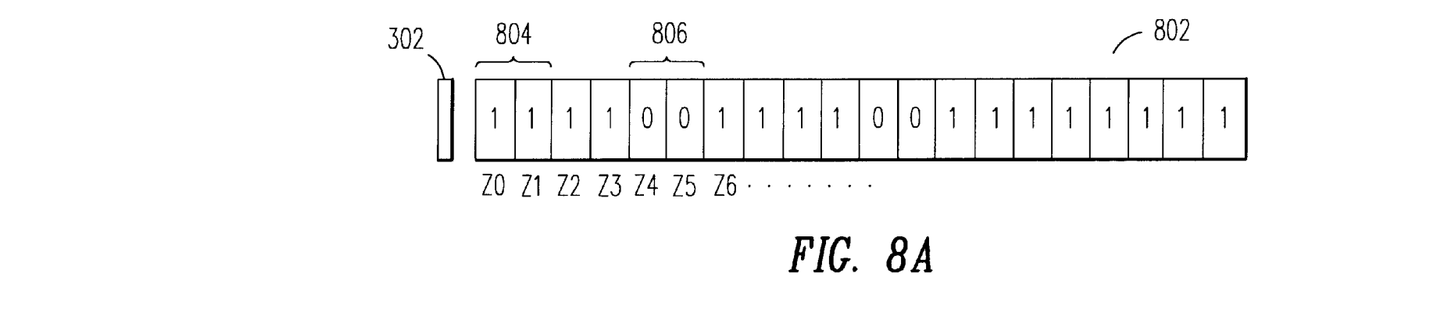
FIG. 8A is a schematic diagram of binary servo data written to a servo burst field according to an alternative embodiment of the present invention.

Finally, FIG. 8A represents an alternative representation scheme wherein a transition pair or "dibit", rather than a single transition, is used to represent each bit of binary servo data in a burst 802 for greater readback reliability. In other words, a one-bit of the binary data is represented by two consecutive transition-containing time slots 804, and each zero-bit is represented by two consecutive empty time slots 806. The binary data represented in FIG. 8A is the same information that was represented in the burst of FIG. 6A. As is readily observable, this representation scheme requires twice the real estate of the previously presented methods, and is therefore desirable when the readback reliability of the servo information outweighs space requirements.

Figure 8B:
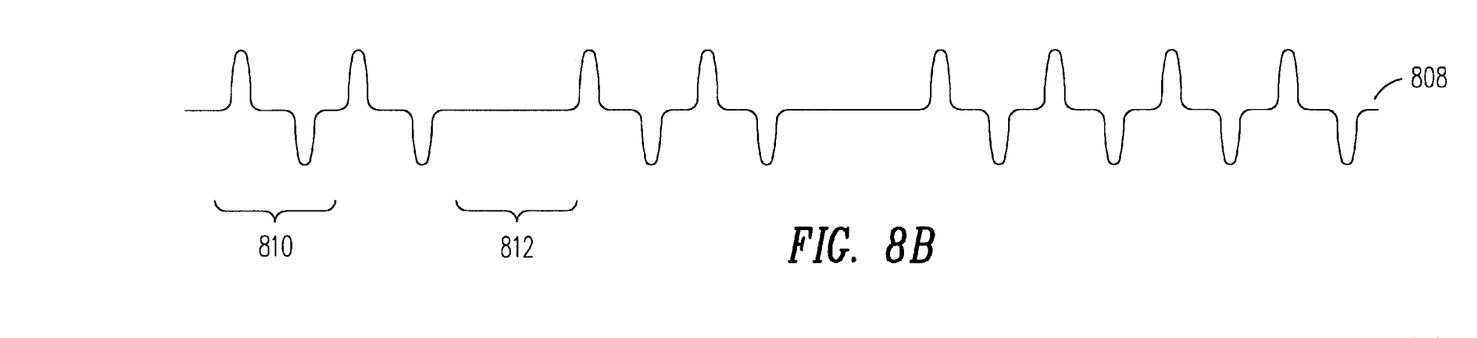
FIG. 8B represents a transducer signal obtained from the burst pattern of FIG. 8A.
Figure 8C:
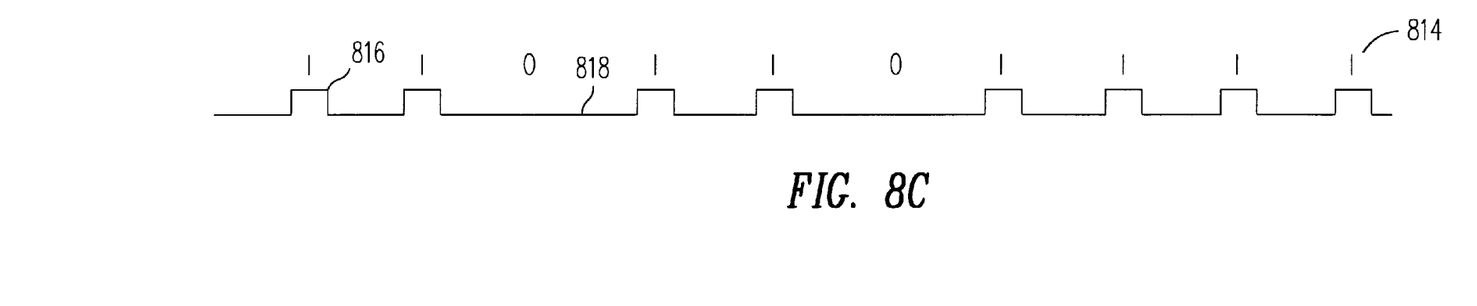
FIG. 8C represents digital data extracted from the transducer signal of FIG. 8B.

The transducer signal 808 generated from burst 802 is shown in FIG. 8B. Each transition pair of the burst produces a dibit 810, whereas a pair of null slots produces a flat signal portion 812. The digital demodulation circuitry is modified for this representation scheme so that a pulse 816 is only generated in the digital pulse stream 814 when the presence of a dibit has been detected in a window of time defined by two clock cycles. The lack of a dibit pair during this time results in a flat signal portion 818.

While the invention has been particularly described and illustrated with reference to a preferred embodiment, it will be understood by those skilled in the art that changes in the description and illustrations may be made with respect to form and detail without departing from the spirit and scope of the invention. Accordingly, the present invention is to be considered as encompassing all modifications and variations coming within the scope defined by the following claims.

We claim:

1. A data storage medium having a storage surface comprising:
   a data storage track including a servo burst written thereon for providing analog position information to position a transducer relative to the track center, the servo burst including tn time slots;
   binary servo data represented within the servo burst, wherein each bit of the binary data is represented in one and only one of the burst time slots, each one-bit of the binary data being represented as a transition, and each zero-bit being represented as a null; and
   wherein both the binary servo data and the analog position information may be retrieved from the same burst.

2. The data storage medium of claim 1, wherein the storage surface further comprises at least one servo region, each servo region including a plurality of bursts.

3. The data storage medium of claim 2, wherein identical binary data is written to each burst of the same servo region.

4. The data storage medium of claim 1, wherein at least a portion of the binary servo data is encoded prior to being written to the burst.

5. The data storage medium of claim 1, wherein the storage medium comprises a data storage disk having a plurality of data storage tracks, and wherein the binary servo data comprises a track number.

6. The data storage medium of claim 1, wherein the storage medium comprises at least one data storage disk and at least two data storage surfaces forming a plurality of data cylinders therebetween, and wherein the binary servo data comprises a cylinder number.

7. The data storage medium of claim 1, wherein the storage medium comprises a plurality of data storage surfaces, and wherein the binary servo data comprises a head number identifying one of the data storage surfaces.

8. The data storage medium of claim 1, wherein the storage surface comprises a plurality of data tracks and a plurality servo regions interspersed between the data tracks, and wherein the binary servo data comprises a sector number.

9. The data storage medium of claim 1, wherein the binary servo data comprises a SID.

10. The data storage medium of claim 1, wherein the binary servo data comprises an index mark.

11. The data storage medium of claim 1, wherein the storage surface includes a plurality of bursts, and wherein the binary servo data is represented in the bursts such that a threshold number of transitions is provided in each burst to facilitate accurate peak-hold demodulation.

12. The data storage medium of claim 11, wherein the storage surface comprises a plurality of servo regions, each including a burst, and wherein the binary servo data is split into a plurality of portions, each portion comprising Xi bits, where tn−Xi is not less than the threshold number, and wherein each portion is represented in a burst of a different one of the plurality of servo regions.

13. The data storage medium of claim 11, wherein the binary servo data comprises a binary word having a plurality of possible values, and wherein each binary word value represented in a burst is encoded as a unique tn-bit pattern having at least the threshold number of one-bits such that when the word is written to a burst, the burst contains at least the threshold number of transitions.

14. The data storage medium of claim 1, wherein, if the binary data has more one-bits than its ones complement, the binary data is written to the burst as is with a pattern indicating that the binary data is written to the burst, and wherein, if the binary data has fewer one-bits than its ones complement, the ones complement is written to the burst with a pattern indicating that the ones complement of binary data is written to the burst.

15. The data storage medium of claim 1, further comprising a transducer positioned in close proximity to the data storage surface for reading information thereon, and a peak-hold detection circuit coupled to the transducer for detecting the analog position information from the information read by the transducer.

16. The data storage medium of claim 1, wherein the storage surface includes a plurality of bursts, and wherein the binary servo data is written to the bursts such that a fixed number of transitions are provided in each burst to facilitate accurate area integration detection.

17. The data storage medium of claim 16, wherein the binary servo information is a binary word having a plurality of possible values, and wherein each word value written the bursts is represented as a unique pattern of N transition-containing slots and M empty slots.

18. The data storage medium of claim 16, wherein the binary servo data comprises X bits, where 2X is less than or equal to tn, and wherein the binary servo data and its ones complement are written to each burst, any remaining ones of the burst time slots being written with transitions.

19. The data storage medium of claim 1, further comprising a transducer positioned in close proximity to the data storage surface for reading information thereon, and an area integration detection circuit coupled to the transducer for detecting the analog position information from the information read by the transducer.

20. The data storage medium of claim 19, further comprising a plurality of bursts, and wherein the area integration detection circuit further comprises means for normalizing the output of the area integration circuit to compensate for variations in the number of transitions in each burst.

21. The data storage medium of claim 20, further comprising a detection circuit for concurrently detecting the binary servo data and analog position information from the burst.

22. The data storage medium of claim 1, wherein each one-bit of the binary data is represented as a dibit, and each zero-bit is represented as a pair of nulls.

23. A data storage device, comprising:
a transducer;
a detection circuit coupled to the transducer; and
a data storage medium disposed in close proximity to the transducer having a storage surface comprising,
a data storage track including a servo burst written thereon for providing analog position information to position the transducer relative to the track center, the servo burst including tn time slots,
binary servo data represented within the servo burst, wherein each bit of the binary data is represented in one and only one of the burst time slots, each one-bit of the binary data being represented as a transition, and each zero-bit being represented as a null, and
wherein both the binary servo data and the analog position information may be read from the same burst by the transducer and detected by the detection circuit.

24. The data storage device of claim 23, wherein the storage surface further comprises at least one servo region, each servo region including a plurality of bursts.

25. The data storage device of claim 24, wherein identical binary data is written to each burst of the same servo region.

26. The data storage device of claim 23, wherein at least a portion of the binary servo data is encoded prior to being written to the burst.

27. The data storage device of claim 23, wherein the storage medium comprises a data storage disk having a plurality of data storage tracks, and wherein the binary servo data comprises a track number.

28. The data storage device of claim 23, wherein the storage medium comprises at least one data storage disk and at least two data storage surfaces forming a plurality of data cylinders therebetween, and wherein the binary servo data comprises a cylinder number.

29. The data storage device of claim 23, wherein the storage medium comprises a plurality of data storage surfaces, and wherein the binary servo data comprises a head number uniquely identifying one of the data storage surfaces.

30. The data storage device of claim 23, wherein the storage surface comprises a plurality of data tracks and a plurality servo regions interspersed between the data tracks, and wherein the binary servo data comprises a sector number.

31. The data storage device of claim 23, wherein the binary servo data comprises a SID.

32. The data storage device of claim 23, wherein the binary servo data comprises an index mark.

33. The data storage device of claim 23, wherein the storage surface includes a plurality of bursts, and wherein the binary servo data is represented in the bursts such that a threshold number of transitions is provided in each burst to facilitate accurate peak-hold detection.

34. The data storage device of claim 33, wherein the storage surface comprises a plurality of servo regions, each including a burst, and wherein the binary servo data is split into a plurality of portions, each portion comprising Xi bits, where tn−Xi is not less than the threshold number, and wherein each portion is represented in a burst of a different one of the plurality of servo regions.

35. The data storage device of claim 33, wherein the binary servo data comprises a binary word having a plurality of possible values, and wherein each binary word value represented in a burst is encoded as a unique tn-bit pattern having at least the threshold number of one-bits such that when the word is written to a burst, the burst contains at least the threshold number of transitions.

36. The data storage device of claim 23, wherein, if the binary data has more one-bits than its ones complement, the binary data is written to the burst as is with a pattern indicating that the binary data is written to the burst, and wherein, if the binary data has fewer one-bits than its ones complement, the ones complement is written to the burst with a pattern indicating that the ones complement of binary data is written to the burst.

37. The data storage device of claim 23, wherein the detection circuit further comprises a peak-hold detection circuit coupled to the transducer for detecting the binary servo data from burst information read by the transducer.

38. The data storage device of claim 23, wherein the storage surface includes a plurality of bursts, and wherein the binary servo data is written to the bursts such that a fixed number of transitions are provided in each burst to facilitate accurate area integration detection.

39. The data storage device of claim 38, wherein the binary servo information is a binary word having a plurality of possible values, and wherein each word value written the bursts is represented as a unique pattern of N transition-containing slots and M empty slots.

40. The data storage device of claim 38, wherein the binary servo data comprises X bits, where 2X is less than or equal to tn, and wherein the binary servo data and its ones complement are written to each burst, any remaining ones of the burst time slots being written with transitions.

41. The data storage device of claim 23, wherein the detection circuit further comprises an area integration detection circuit coupled to the transducer for detecting the binary servo data from burst information read by the transducer.

42. The data storage device of claim 41, wherein the storage medium comprises a plurality of bursts, and wherein the peak-hold detection circuit further comprises means for normalizing the output of the area integration circuit to compensate for variations in the number of transitions in each burst.

43. The data storage device of claim 42, further comprising a detection circuit for concurrently detecting the binary servo data and analog position information from the burst.

44. The data storage device of claim 23, wherein each one-bit of the binary data is represented as a dibit, and each zero-bit is represented as a pair of nulls.

45. A method for representing binary servo data in a servo burst residing on a storage medium, the burst having tn time slots, comprising the steps of:

representing each bit of the binary data in one and only one of the burst time slots, each one-bit of the binary data being represented as a transition, and each zero-bit being represented as a null, whereby both binary servo data and analog position information may be retrieved from the same burst.

46. The method of claim 45, wherein the storage medium further comprises at least one servo region, each servo region including a plurality of bursts.

47. The method of claim 46, wherein identical binary data is written to each burst of the same servo region.

48. The method of claim 45, wherein at least a portion of the binary servo data is encoded prior to being written to the burst.

49. The method of claim 45, wherein the storage medium comprises a data storage disk having a plurality of data storage tracks, and wherein the binary servo data comprises a track number.

50. The method of claim 45, wherein the storage medium comprises at least one data storage disk and at least two data storage surfaces forming a plurality of data cylinders therebetween, and wherein the binary servo data comprises a cylinder number.

51. The method of claim 45, wherein the storage medium comprises a plurality of data storage surfaces, and wherein the binary servo data comprises a head number uniquely identifying one of the data storage surfaces.

52. The method of claim 45, wherein the storage medium comprises a plurality of data tracks and a plurality servo regions interspersed between the data tracks, and wherein the binary servo data comprises a sector number.

53. The method of claim 45, wherein the binary servo data comprises a SID.

54. The method of claim 45, wherein the binary servo data comprises an index mark.

55. The method of claim 45, wherein the storage medium includes a plurality of bursts, and further comprising the step of writing the binary servo data to the bursts such that a threshold number of transitions is provided in each burst to facilitate accurate peak-hold detection.

56. The method of claim 55, wherein the storage medium comprises a plurality of servo regions, each including a burst, and further comprising the steps of:

determining the difference between tn and the number of bits of binary servo data to be written, X, if the difference is less than the threshold number, then splitting the binary servo data into a plurality of portions, each portion comprising Xi bits, where tn−Xi is not less than the threshold number, and writing each portion to a different one of the plurality of servo regions.

57. The method of claim 55, wherein the binary servo data comprises a binary word having a plurality of possible values, and further comprising the step of encoding each binary word value as a unique tn-bit pattern having at least the threshold number of one-bits such that when the word is written to a burst, the burst contains at least the threshold number of transitions.

58. The method of claim 45, further comprising the steps of:

determining whether the binary data or its ones complement has more one-bits, if the binary data has more one-bits, writing the binary data to one of the bursts with a pattern indicating that the binary data is written to the burst, and if the ones complement of the binary data has more one-bits, writing the ones complement of the binary data to one of the bursts with a pattern indicating that the ones complement of binary data is written to the burst.

59. The method of claim 45, further comprising the step of detecting the binary servo data from the burst using a peak-hold detection circuit.

60. The method of claim 45, wherein the storage medium includes a plurality of bursts, and wherein the binary servo data is written to the bursts such that a fixed number of transitions are provided in each burst to facilitate accurate area integration detection.

61. The method of claim 60, wherein the binary servo information is a binary word having a plurality of possible values, and further comprising the step of representing each word value to be written as a unique pattern of N transition-containing slots and M empty slots.

62. The method of claim 60, wherein the binary servo data comprises X bits, where 2X is less than or equal to tn, and wherein the binary servo data and its ones complement are written to each burst, any remaining ones of the burst time slots being written with transitions.

63. The method of claim 45, further comprising the step of detecting the binary servo information from the burst using area integration detection circuit.

64. The method of claim 63, wherein the storage medium comprises a plurality of bursts, and wherein the peak-hold detection circuit further comprises means for normalizing the output of the area integration circuit to compensate for variations in the number of transitions in each burst.

65. The method of claim 64, further comprising the steps of concurrently detecting the binary servo data and analog burst information from the burst.

66. The method of claim 45, wherein each one-bit of the binary data is represented as a dibit, and each zero-bit is represented as a pair of nulls.

* * * * *

UNITED STATES PATENT AND TRADEMARK OFFICE
CERTIFICATE OF CORRECTION

PATENT NO. : 6,049,438
DATED : April 11, 2000
INVENTOR(S) : L. J. Serrano et al.

It is certified that error appears in the above-indentified patent and that said Letters Patent is hereby corrected as shown below:

Column 16, line 4, "whereby" should be --so that--.

Signed and Sealed this

Third Day of April, 2001

Attest:

NICHOLAS P. GODICI

*Attesting Officer*      *Acting Director of the United States Patent and Trademark Office*